July 30, 1940.                C. H. SUTHERLAND                2,209,363
                                VENTILATION SYSTEM
                               Filed March 21, 1939
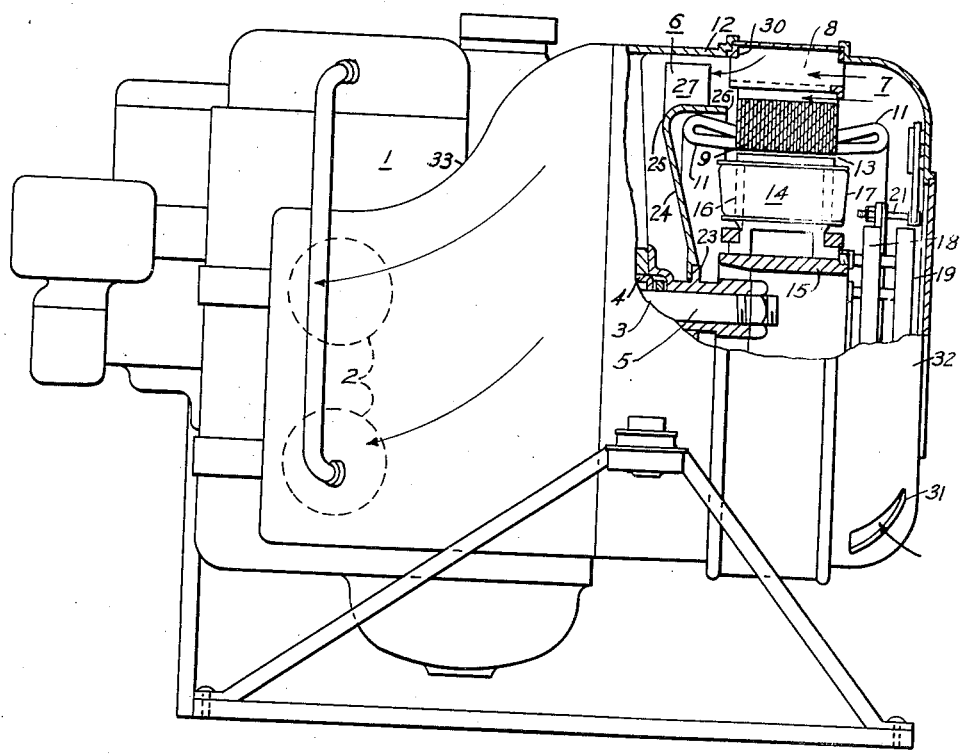
WITNESSES:
INVENTOR
Carl H. Sutherland.
BY
ATTORNEY Patented July 30, 1940

2,209,363

UNITED STATES PATENT OFFICE 2,209,363

VENTILATION SYSTEM

Carl H. Sutherland, Wilkinsburg, Pa., assignor to Westinghouse Electric & Manufacturing Company, East Pittsburgh, Pa., a corporation of Pennsylvania Application March 21, 1939, Serial No. 263,167

2 Claims. (Cl. 290—1)

My present invention relates to ventilating means for a power plant consisting of an internal-combustion engine and an electrical generator, and it has particular relation to such a power plant for auxiliary power purposes on aircraft, where the requirements are particularly rigid respecting the minimum permissible weights.

More particularly, my invention relates to the particular kind of power plant in which the engine shaft has an overhanging end which must carry the generator and which must be made as short as possible, in order to avoid excessive bearing strains and vibration. A particular object of my invention is to provide a single fan or blower, mounted on this short overhanging shaft-end between the generator and the engine, in combination with air-directing means for causing the fan to draw air first through the generator and then through the fan, and finally to blow the air into heat-exchanging relation to the engine. In this way, with a minimum number of parts, and hence with a minimum weight, the electrical parts are cooled by means of air which is at a lower temperature than the air which cools the engine, thus materially contributing to the efficiency of the heat-exchange, in both cases, because the optimum temperature of operation of the internal-combustion engine is, in general, higher than the highest permissible temperature of operation of the generator.

With the foregoing and other objects in view, my invention consists in the combinations, methods, systems and elements hereinafter described and claimed, and illustrated in the accompanying drawing, the single figure of which is a somewhat simplified end-elevational view, with parts broken away in longitudinal section to illustrate the construction.

In the particular embodiment of my invention shown in the drawing, an internal-combustion engine 1, with horizontally disposed cylinders 2, is utilized to drive an engine-shaft 3, one of the supporting bearings of which is indicated at 4. The engine-shaft 3 has a short overhanging end 5 which is utilized to support a fan 6 and an electrical generator 7. The particular generator 7 which is shown in the drawing is a polyphase synchronous generator of moderately high frequency, having a stator member 8 which comprises a magnetizable core 9, stator windings carried by said core, said stator windings having end-turns 11 extending axially beyond both sides of the core 9, and a frame-housing 12 which is spaced radially from the end-turns 11 of the stator windings. The stator member 8 is spaced, by an annular air-gap 13, from the rotor member 14 of the generator, which is mounted on a spider 15 which is carried by the end of the short overhanging shaft-end 5. The rotor member 14 is provided with a plurality of pole pieces 16 which are energized by exciting windings 17 to which current is carried by means of current-collecting rings 18 and 19 and brush-mechanisms 21.

In accordance with my invention, the fan 6 has a hub portion 23 which is mounted on the short overhanging shaft-end 5, between the rotor member 14 of the generator 7 and the internal-combustion engine 1. The fan 6 also has a dished or spider portion 24 which extends approximately radially outwardly from the hub portion 23. Preferably, and specifically, this dished or spider portion 24 extends both radially out from the hub portion and axially back toward the engine, away from the generator 7, so that the outer peripheral part 25 of this dished portion 24 is axially spaced from the adjacent end-turns 11 of the stator winding. The outer peripheral portion 25 of the dished fanspider 24 merges into a cylindrical member 26, and overlies, but is spaced from, the adjacent end-turns 11 of the stator winding of the generator, and this cylindrical portion 26 carries a plurality of propeller-type fan-blades 27 which rotate in the annular space between said end-turns 11 and the frame-housing 12, and which cause air to be blown in an axial direction, so as to flow in the direction from the generator 7 to the engine 1.

Suitable air-directing means are provided, in the form of a relatively large air-intake opening or openings 30 in the generator-frame 12 at a portion radially opposite the core-member 9, where the greater portion of the cooling-air may enter the system; and also a smaller air-intake opening or openings 31 in the end-bell 32 of the generator-frame for admitting the right proportion of air for cooling the heated portions of the generator which are not reached by the air entering the opening or openings 30; and an extension 33 of the stator-frame 13, which merges into the engine-housing, and finally directs the air into heat-exchanging relation to the engine, where it may cool the engine-cylinders 2 either directly or through the mediation of a water-cooling system, as is well understood. The progress of the air through the system is indicated by arrows on the drawing.

It will be noted that the air is passed first over the heated parts of the generator 7, where the air is partially heated, and the partially heated air is subsequently supplied to the engine to cool the same, thus maintaining the engine, as is desired, at a higher temperature than the generator.

It will also be noted that the dished or off-set arrangement of the fan-spider 24 serves the purpose of utilizing a much shorter overhanging shaft-end 5 than would otherwise have been possible, and the disposition of the fan-blades 27 in the annular space between the adjacent end-turns 11 of the stator winding and the stator-housing 12 further reduces the amount of space, measured in an axial direction, which is required for the requisite parts of the ventilating system.

While I have described and illustrated my invention in connection with a single preferred form of embodiment, it will be understood that various changes and modifications may be made by those skilled in the art without departing from the essential spirit of my invention. I desire, therefore, that the appended claims shall be accorded the broadest construction consistent with their language and the prior art.

I claim as my invention:

1. A power plant comprising an internal-combustion engine having a shaft having an overhanging end, a fan and a rotor member of an electric generator mounted on said overhanging shaft-end, and a stator member of the generator mounted in cooperative relation to said rotor member, said stator member comprising a magnetizable core, stator windings carried by said core, said stator windings having end-turns extending axially beyond both sides of the core, and a frame-housing spaced radially from the end-turns of said stator windings, said fan having a hub portion disposed between said rotor member and said engine, a dished portion extending radially out from the hub portion and axially back toward the engine, away from the generator, the outer peripheral part of the dished portion being axially spaced from the adjacent end-turns of the stator winding, and a plurality of propeller-type fan-blade members supported by said dished portion and disposed in the annular space between said adjacent end-turns and the frame-housing, said frame-housing being provided, at another point or points, with an air-intake opening or openings so disposed that the fan-blades draw air in through said air-intake opening or openings, over heated parts of the generator, and thence to the blades, said frame-housing being, in effect, extended on to the engine in such manner as to direct the partially heated air, which is discharged by said blades, to the engine to cool the engine.

2. A power plant comprising an internal-combustion engine having a shaft having an overhanging end, a fan and a rotor member of an electric generator mounted on said overhanging shaft-end, and a stator member of the generator mounted in cooperative relation to said rotor member, said stator member comprising a magnetizable core, stator windings carried by said core, said stator windings having end-turns extending axially beyond both sides of the core, and a frame-housing spaced radially from the end-turns of said stator windings, said fan having a hub portion disposed between said rotor member and said engine, a spider portion extending approximately radially outwardly from said hub portion in spaced relation to the adjacent end-turns of the stator winding, and a plurality of propeller-type fan-blade members supported by said spider portion and disposed in the annular space between said adjacent end-turns and the frame-housing, said frame-housing being provided, at another point or points, with an air-intake opening or openings so disposed that the fan-blades draw air in through said air-intake opening or openings, over heated parts of the generator, and thence to the blades, said frame-housing being, in effect, extended on to the engine in such manner as to direct the partially heated air, which is discharged by said blades, to the engine to cool the engine.

CARL H. SUTHERLAND.